US008838023B2

(12) United States Patent
Charrat et al.

(10) Patent No.: US 8,838,023 B2
(45) Date of Patent: Sep. 16, 2014

(54) METHOD AND DEVICE FOR ACTIVE LOAD MODULATION BY INDUCTIVE COUPLING

(75) Inventors: Bruno Charrat, Aix-en-Provence (FR); Florian Pernisek, Les Milles (FR)

(73) Assignee: INSIDE Secure, Aix-en-Provence (FR)

( * ) Notice: Subject to any disclaimer, the term of this patent is extended or adjusted under 35 U.S.C. 154(b) by 325 days.

(21) Appl. No.: 13/235,701

(22) Filed: Sep. 19, 2011

(65) Prior Publication Data

US 2012/0071089 A1 Mar. 22, 2012

(30) Foreign Application Priority Data

Sep. 21, 2010 (FR) ..................................... 10 03754

(51) Int. Cl.
*H04B 5/00* (2006.01)
*G06K 19/07* (2006.01)

(52) U.S. Cl.
CPC ................. *H04B 5/0031* (2013.01); *G06K 19/0723* (2013.01)
USPC ........................................ 455/41.1; 455/558

(58) Field of Classification Search
CPC .. H04B 5/0025; H04B 5/0031; H04B 5/0037; H04B 5/0043; H04B 5/0062; H04B 5/0075; H04B 5/0081; H04B 5/0093; G06K 19/0723–19/0728
USPC .................. 455/41.1–41.3; 235/451, 462.13; 340/10.1, 492, 493, 572.1
See application file for complete search history.

(56) References Cited

U.S. PATENT DOCUMENTS

| 3,701,150 A | 10/1972 | Dame |
| 4,916,329 A * | 4/1990 | Dang et al. ..................... 307/66 |
| 5,251,235 A * | 10/1993 | Henoch ......................... 375/259 |
| 5,453,667 A * | 9/1995 | Matsuda et al. .............. 315/248 |
| 5,453,748 A | 9/1995 | Lindell |
| 5,929,779 A | 7/1999 | MacLellan et al. |
| 7,098,770 B2 | 8/2006 | Charrat et al. |
| 7,106,246 B1 | 9/2006 | Lindell |
| 2005/0231369 A1 * | 10/2005 | Friedrich et al. ........... 340/572.1 |
| 2007/0023517 A1 | 2/2007 | Tan et al. |

(Continued)

FOREIGN PATENT DOCUMENTS

| DE | 102004031092 A1 | 1/2006 |
| DE | 102007061361 A1 | 1/2009 |

(Continued)

OTHER PUBLICATIONS

Search Report issued Mar. 23, 2011 in FR Application No. 1003752; Written Opinion.

(Continued)

*Primary Examiner* — Golam Sorowar
(74) *Attorney, Agent, or Firm* — Panitch Schwarze Belisario & Nadel LLP

(57) ABSTRACT

A data emission/reception device by inductive coupling includes an inductive antenna circuit in which an antenna signal appears, a mechanism configured to for extracting a first periodic signal from the antenna signal, a synchronous oscillator receiving the first periodic signal and supplying a second periodic signal, and an active load modulation circuit configured to apply bursts of the second periodic signal to the antenna circuit. The device is configured to place the oscillator in the synchronous oscillation mode before each application of a burst of the second periodic signal to the antenna circuit, then place the oscillator in the free oscillation mode.

16 Claims, 4 Drawing Sheets

(56) References Cited

U.S. PATENT DOCUMENTS

| | | | |
|---|---|---|---|
| 2008/0210762 A1* | 9/2008 | Osada et al. | 235/492 |
| 2009/0108063 A1 | 4/2009 | Jain et al. | |
| 2009/0284377 A1 | 11/2009 | Tuttle et al. | |
| 2009/0315749 A1* | 12/2009 | McCoy et al. | 341/155 |
| 2010/0197349 A1* | 8/2010 | Morita et al. | 455/558 |

FOREIGN PATENT DOCUMENTS

| | | | |
|---|---|---|---|
| DE | 102011101763 A1 | 11/2012 | |
| EP | 0600374 A1 | 6/1994 | |
| EP | 0768540 A1 | 4/1997 | |
| EP | 1 327 222 B1 | 7/2003 | |
| EP | 1801741 A2 | 6/2007 | |
| EP | 2211295 A2 | 7/2010 | |
| WO | 9858509 A1 | 12/1998 | |
| WO | 0167625 A1 | 9/2001 | |
| WO | 2005/045744 A1 | 5/2005 | |

OTHER PUBLICATIONS

Search Report issued Jul. 28, 2011 in FR Application No. 1151552; Written Opinion.

ISO Standard 15693, Part 2: "Identification cards—Contactless integrated circuit cards—Vicinity cards—Air interface and initialization," published 2006 by the International Organization for Standardization, 14 pages.

ISO Standard 15693, Part 3: "Identification cards—Contactless integrated circuit cards—Vicinity cards—Anticollision and transmission protocol," published 2009 by the International Organization for Standardization, 43 pages.

ISO Standard 14443, Introduction: "An introduction to the contactless standard for smart cards and its relevance to customers," published by the International Organization for Standardization, 9 pages.

ISO Standard 14443, Part 2: "Identification cards—Contactless integrated circuit cards—Proximity cards—Radio frequency power and signal interface," published 2010 by the International Organization for Standardization, 24 pages.

ISO Standard 14443, Part 3: "Identification cards—Contactless integrated circuit cards—Proximity cards—Initialization and anticollision," published 2011 by the International Organization for Standardization, 60 pages.

ISO Standard 14443, Part 4: "Identification cards—Contactless integrated circuit cards—Proximity cards—Transmission protocol," published 2008 by the International Organization for Standardization, 37 pages.

ISO Standard 18092: "Information technology—Telecommunications and information exchange between systems—Near Field Communication—Interface and Protocol," published 2004 by the International Organization for Standardization, 58 pages.

ISO Standard 7816, Part 3: "Identification cards—Integrated circuit cards—Cards with contacts—Electrical interface and transmission protocols," published 2006 by the International Organization for Standardization, 50 pages.

ISO Standard 7816, Part 4: "Identification cards—Integrated circuit cards—Organization, security and commands for interchange," published 2005 by the International Organization for Standardization, 83 pages.

Search Report issued Jul. 18, 2011 in FR Application No. 1003754; Written Opinion.

Response to Opposition (Translation).

Grounds for Opposition—Opposition Brief.

* cited by examiner

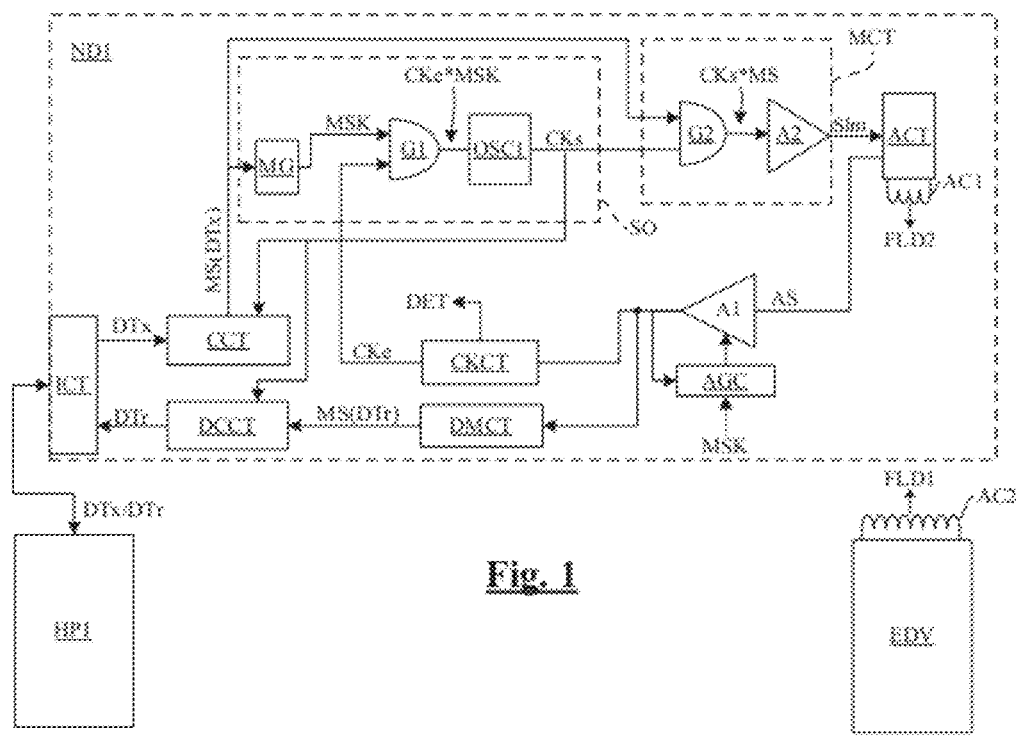
Fig. 1
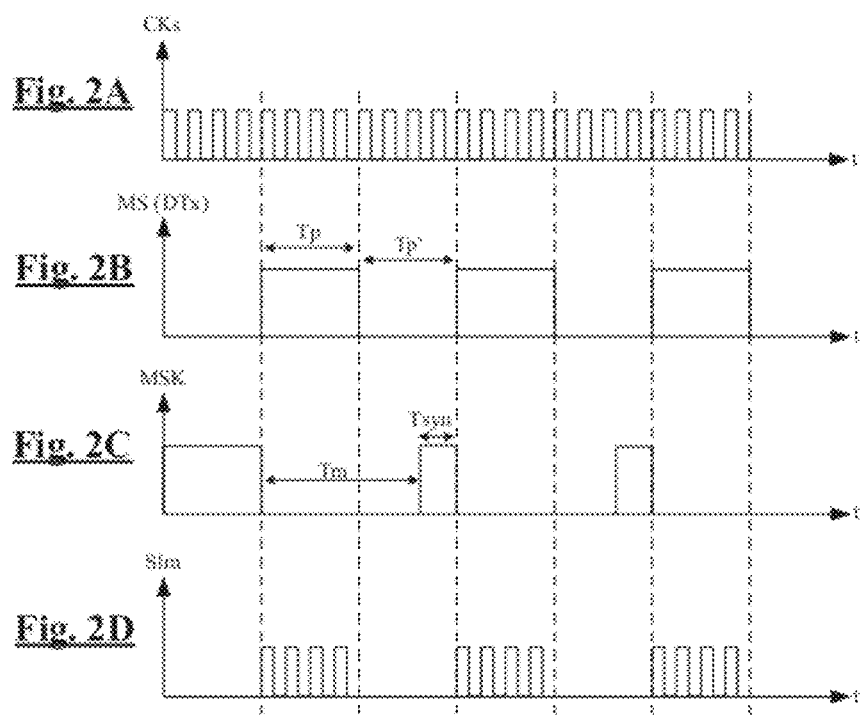
Fig. 2A
Fig. 2B
Fig. 2C
Fig. 2D

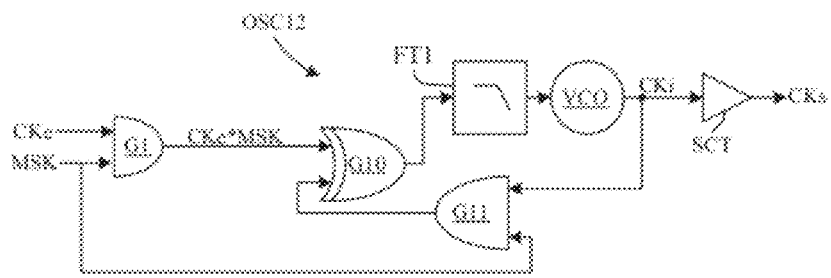
Fig. 6
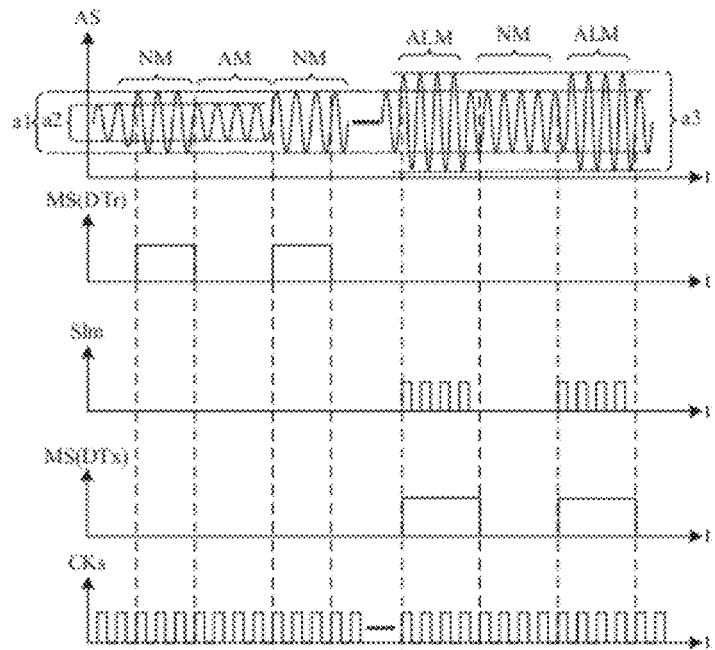
Fig. 7A
Fig. 7B
Fig. 7C
Fig. 7D
Fig. 7E
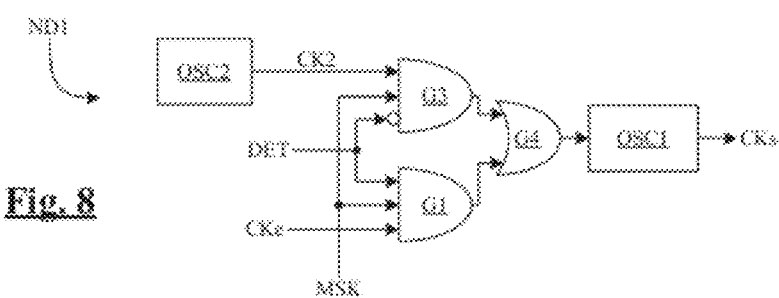
Fig. 8

METHOD AND DEVICE FOR ACTIVE LOAD MODULATION BY INDUCTIVE COUPLING

BACKGROUND OF THE INVENTION

Embodiments of the present invention relate to a method of transmitting data by inductive coupling, including the steps of receiving an antenna signal using an inductive antenna circuit in the presence of an alternating external magnetic field, extracting from the antenna signal a first periodic signal, producing a second periodic signal using a synchronous oscillator having a synchronization input receiving the first periodic signal, placing the oscillator in a free oscillation mode, and applying to the antenna circuit bursts of the second periodic signal to generate an active load modulation magnetic field.

Embodiments of the present invention also relate to a device for transmitting and receiving data configured to implement this method.

In a general manner, embodiments of the present invention relate to inductive coupling communication techniques, also known as "Near Field Communications" or NFC. A communication by inductive coupling generally requires a "passive" device and an "active" device. The two devices are equipped with an antenna coil. The active device emits a magnetic field oscillating, for example, at 13.56 MHz, and sends data to the passive device by modulating the magnetic field. In the following, this magnetic field is designated as an "external magnetic field". The passive device sends data to the active device by load modulation.

The load modulation may be passive or active. Passive load modulation includes modifying the impedance of the antenna coil of the passive device at the rate of a data-carrying load modulation signal. This impedance modulation is echoed by inductive coupling in the impedance of the antenna coil of the active device. The active device may therefore extract from its antenna signal the load modulation signal used by the passive device, and deduce therefrom the data that the passive device sent it.

Active load modulation includes transmitting, at the rate of the data carrying modulation signal, bursts of alternating magnetic field. The magnetic field bursts are perceived by the active device as a passive load modulation. This technique was proposed by the applicant in European patent EP 1 327 222 (U.S. Pat. No. 7,098,770B2), see FIGS. 4A to 4E, page 8 table 4, paragraph 074.

Active load modulation offers, with respect to passive load modulation, a greater communication distance and/or a better data transmission in a hostile environment, for example an environment perturbed by metallic masses generating Foucault (Eddy) currents. Active load modulation requires, on the other hand, excitation of the antenna coil and thus a current source, but consumes much less current than a continuous emission of a magnetic field.

An active load modulation device cannot therefore be purely passive in terms of electrical supply (a purely passive device being electrically supplied by the magnetic field emitted by the active device) but is nevertheless considered as "passive" in that it does not emit the external magnetic field necessary for the communication.

To obtain a maximum communication distance, the active load modulation also requires that the load modulation magnetic field be in phase with the external magnetic field emitted by the active device. Phase rotations between the active load modulation magnetic field and the external magnetic field may cause undesirable fluctuations in the communication distance.

European Patent EP 1 801 741 describes an active load modulation NFC device using a phase locking loop to control the phase of the load modulation magnetic field (see FIG. 19 thereof). The phase locking loop includes a Voltage-Controlled Oscillator VCO, a phase comparator, and a low pass filter supplying a control voltage to the VCO. The phase comparator receives, as a reference frequency, a first periodic signal extracted from the antenna signal induced by the external magnetic field. The phase locking loop supplies a second periodic signal of which the phase is set on that of the first periodic signal. In the data emission mode, bursts of the second periodic signal are applied to the antenna circuit to generate the magnetic field bursts.

When the device switches into the data emission mode, the first periodic signal is no longer applied to the phase comparator and a sampling circuit HLD ("Sample Hold") maintains the control voltage applied to the VCO. The phase locking loop thus switches from a synchronous functioning mode to a free oscillation mode and remains in this functioning mode until the end of the data emission.

If it is desired that the magnetic field bursts be in phase with the external magnetic field, the phase locking loop must have a slight phase drift during the entire duration of the data emission mode, which is at least equal to the data frame emission duration. In practice, the maximal phase difference tolerated for this period is generally on the order of ¼th of the period of the magnetic field oscillating at 13.56 MHz.

As an example, an ISO 14443-A frame has a duration on the order of 25.6 ms. The frequency of the periodic signal being 13.56 MHz, the phase drift of the phase locking loop in free oscillation mode is preferably not more than 18 ns, that is ¼th of the period of the magnetic field oscillating at 13.56 MHz.

However, obtaining a stability greater than 18 ns over a duration of 25.6 ms signifies that the phase locking loop must offer an extreme precision, on the order of 0.7 ppm ($(18 \times 10^{-9}/25.6 \times 10^{-3})*10^6$). Such a precision requires a very high quality and expensive circuitry.

It may therefore be desired to provide an apparatus that allows magnetic field bursts having little phase drift relative to the external magnetic field to be provided, without using an extremely precise and expensive circuitry.

BRIEF SUMMARY OF THE INVENTION

To this end, embodiments of the present invention propose the use of a synchronous oscillator and to resynchronize the oscillator on the external magnetic field before each application of a burst of a periodic signal supplied by the oscillator to the antenna circuit.

More particularly, embodiments of the invention relate to a method of transmitting data by inductive coupling, including the steps of receiving an antenna signal using an inductive antenna circuit in the presence of an alternating external magnetic field, extracting from the antenna signal a first periodic signal, producing a second periodic signal using a synchronous oscillator having a synchronization input receiving the first periodic signal, the oscillator having a synchronous oscillation mode set in phase with the first periodic signal and a free oscillation mode, and applying to the antenna circuit bursts of the second periodic signal to generate an active load modulation magnetic field, wherein the method further includes the steps of placing the oscillator in the synchronous oscillation mode before each application of a burst of the second periodic signal to the antenna circuit, and placing the oscillator in a free oscillation mode during the application of a burst of the second periodic signal to the antenna circuit.

According to one embodiment, the method includes the step of, after the application of a burst of the second periodic signal to the antenna circuit, maintaining the oscillator in the free oscillation mode during a stabilization time of the antenna signal, before placing the oscillator back in the synchronous oscillation mode.

According to one embodiment, the method includes the steps of supplying a data carrying modulation signal, applying the second periodic signal to the antenna circuit when the modulation signal has a first logic value, generating a masking signal having a masking value at least when the modulation signal has the first logic value, and blocking the application of the first periodic signal to the synchronization input of the oscillator when the masking signal has the masking value.

According to one embodiment, the method includes the step of conferring to the masking value of the masking signal a duration greater than that of the first logic value of the modulation signal, in order to maintain the oscillator in the free oscillation mode during the stabilization time of the antenna signal.

According to one embodiment, the method includes a step of phase shifting the second periodic signal relative to the antenna signal.

Embodiments of the invention also relate to a data emission/reception device by inductive coupling including an inductive antenna circuit in which an antenna signal appears in the presence of an alternating external magnetic field, a mechanism configured to extract a first periodic signal from the antenna signal, a synchronous oscillator having a synchronization input receiving the first periodic signal, supplying a second periodic signal, the oscillator having a synchronous oscillation mode set in phase with the first periodic signal and a free oscillation mode, and an active load modulation circuit configured to apply bursts of the second periodic signal to the antenna circuit and to generate an active load modulation magnetic field, wherein the device is configured to place the oscillator in the synchronous oscillation mode before each application of a burst of the second periodic signal to the antenna circuit, and place the oscillator in the free oscillation mode during the application of a burst of the second periodic signal to the antenna circuit.

According to one embodiment, the device is configured to, after the application of a burst of the second periodic signal to the antenna circuit, maintain the oscillator in the free oscillation mode during a stabilization time of the antenna signal, before again placing the oscillator in the synchronous oscillation mode.

According to one embodiment, the device is configured to generate or receive a data carrying load modulation signal, apply the second periodic signal to the antenna circuit when the modulation signal has a first logic value, generate a masking signal having a masking value at least when the modulation signal has the first logic value, and block the application of the first periodic signal to the synchronization input of the oscillator when the masking signal has the masking value.

According to one embodiment, the device is configured to confer, to the masking value of the masking signal, a duration greater than that of the first logic value of the modulation signal, in order to maintain the oscillator in the free oscillation mode during the stabilization time of the antenna signal.

According to one embodiment, the synchronous oscillator is of the astable oscillator type having its own auto-oscillation frequency determined by components of the oscillator.

According to one embodiment, the synchronous oscillator is of the digital type and is configured to, in the synchronous oscillation mode, recopy the period of the periodic signal applied on the synchronization input, and, in the free oscillation mode, reconstitute the frequency received on the synchronization input during the synchronous oscillation mode.

According to one embodiment, the synchronous oscillator includes a phase locking loop including a phase comparator supplying a phase signal, an active low-pass filter receiving the phase signal and supplying a control voltage, a voltage controlled oscillator receiving the control voltage and supplying the second periodic signal, and a mechanism configured to block the phase comparator when switching into the free oscillation mode and to maintain the value of the control voltage at the input of the voltage controlled oscillator.

According to one embodiment, the device includes a mechanism configured to phase shift the second periodic signal relative to the antenna signal.

Embodiments of the invention also relate to a device including a data emission/reception device according to one of the embodiments described above, and at least one host processor supplying the data to transmit to the device.

According to one embodiment, the device is mounted in or on a portable support.

Embodiments of the invention also relate to a chip card, including at least one processor and a data emission/reception device according to one of the embodiments described above.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Embodiments of a method and of a device according to the invention will be described in the following in a non-limiting manner in relation with the appended drawings, among which in the drawings:

FIG. 1 shows an NFC data emission/reception device according to an embodiment of the invention including a synchronous oscillator;

FIGS. 2A to 2D show signals used in the functioning of the device of FIG. 1 during the emission of data by active load modulation;

FIG. 6 shows a second embodiment example of a synchronous oscillator;

FIG. 7A shows the form of an antenna signal of the device of FIG. 1 during the reception and the emission of data;

FIGS. 7B to 7E show signals associated with the antenna signal;

FIG. 8 shows an implementation variation of a part of the device of FIG. 1;

DETAILED DESCRIPTION OF THE INVENTION

Figure 3A:
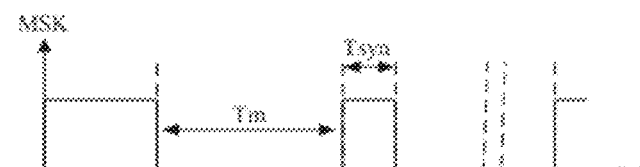
FIGS. 3A to 3D show other signals used in the functioning of the device of FIG. 1 during the emission of data by active load modulation.

FIG. 1 shows a data emission/reception device ND1 according to an embodiment of the invention, functioning by inductive coupling. Device ND1 includes:
- a contact communication interface circuit ICT,
- an antenna circuit ACT turned to a carrier frequency, including an antenna coil AC1 and may optionally include various other components such as capacitors and/or inductors,
- a demodulation circuit DMCT coupled to a decoding circuit DCCT, to receive data DTr via the antenna circuit,
- a coding circuit CCT coupled to a modulation circuit MCT, to transmit data DTx via the antenna circuit,
- a clock circuit CKCT, and
- a synchronous oscillator SO.

Contact communication interface circuit ICT allows device ND1 to be linked to at least one host processor HP1. Host processor HP1 supplies data DTx and receives data DTr. Data DTx/DTr are generally application data of an NFC application NFC (transaction, payment, exchange of information, etc.). In one variation, device ND1 may be autonomous and include an internal processor configured to manage contactless applications. The internal processor thus manages itself data DTx and processes data DTr.

Clock circuit CKCT and demodulation circuit DMCT receive an antenna signal AS present in antenna circuit ACT. Antenna signal AS is, for example, extracted from the antenna circuit by an amplifier A1 of which the gain is controlled by automatic gain control circuit AGC. Antenna signal AS appears in the presence of an alternating external magnetic field FLD1 emitted by an external device EDV of the NFC reader type, equipped with an antenna coil AC2 and functioning in active mode (continuous emission of the magnetic field). Field FLD1 oscillates for example at a carrier frequency of 13.56 MHz (standards ISO 14443, ISO 13693, Sony Felica).

Clock circuit CKCT supplies an external clock signal CKe, or "first periodic signal", the frequency of which is generally identical to the carrier frequency, that is 13.56 MHz in the framework of the previously-cited standards. In one embodiment, circuit CKCT also supplies a signal DET that has a determined value, for example 1, when field FLD2 is detected. Signal DET forms a carrier detection signal that may be useful in certain embodiments of device ND1.

Synchronous oscillator SO receives external clock signal CKe and supplies an internal clock signal CKs, or "second periodic signal". Oscillator SO has a synchronous oscillation mode where the phase of signal CKs is set on that of signal CKe, and a free oscillation mode where signal CKs is no longer set in phase with signal CKe.

To send data DTr to device ND1, external device EDV applies a modulation, for example an amplitude modulation, using a data carrying modulation signal MS(DTr) to magnetic field FLD1. Signal MS(DTr) is echoed in antenna signal AS and is extracted therefrom by demodulation circuit DMCT, after suppression of the carrier. Circuit DMCT supplies modulation signal MS(DTr) to circuit DCCT, which decodes and supplies data DTr to communication interface circuit ICT or to the internal processor of device ND1 if this latter is equipped with such a processor.

Data DTx to send to external device EDV are supplied to coding circuit CCT, which supplies a data carrying modulation signal MS(DTx) to modulation circuit MCT. This modulation signal MS(DTx) may be modulated with a sub-carrier derived from the carrier frequency, for example a sub-carrier of 848 kHz (ISO 14443) or of 424 kHz (ISO 15693), or simply be coded in baseband without a sub-carrier (Sony Felica). To generate the sub-carrier, circuit MCT receives internal clock signal CKs supplied by the synchronous oscillator.

Modulation circuit MCT is here an active load modulation circuit implementing the method described by the applicant in European patent EP 1 327 222 (U.S. Pat. No. 7,098,770B2). Circuit MCT supplies, to antenna circuit ACT, an active load modulation signal Slm that includes bursts (wavetrains) of internal clock signal CKs, separated by non-modulation periods where signal Slm has a default value, for example 0. Modulation circuit MCT here includes a logic gate G2 of the AND type receiving signals CKs and MS(DTx) and supplying signal Slm, and an amplifier A2 linking the output of gate G2 and the point of application of signal Slm to antenna circuit ACT.

Signal Slm is here equal to 0 when signal MS(DTx) is equal to 0, and recopies signal CKs when signal MS(DTx) is equal to 1. Thus, when signal MS(DTx) is equal to 1, antenna circuit ACT receives a burst of signal CKs and antenna coil AC1 emits a corresponding burst of a magnetic field FLD2. The bursts of magnetic field FLD2 are detected by external device EDV as a passive load modulation. This latter may thus extract, from its own antenna signal, signal MS(DTx) to deduce therefrom data DTx sent by device ND1.

Synchronous oscillator SO includes an oscillator circuit OSC1 including a synchronization input linked to the output of a masking circuit G1, here an AND Gate. Gate G1 receives on its inputs external clock signal CKe and a masking signal MSK. Signal MSK is supplied by a mask generator MG from a modulation signal MS(DTx). Signal MSK has a masking value, here 0, and a transparent value, here 1. Oscillator circuit OSC1 synchronizes itself upon external clock signal CKe when it is not masked (MSK=1) upon its synchronization input, and functions in free oscillation mode when signal CKe is masked (MSK=0).

In one embodiment, the masking signal has the masking value (MSK=0) only when modulation signal MS(DTX) has a value corresponding to the emission of a burst of a magnetic field FLD2, here 1, and has the transparent value (MSK=1) otherwise. In this case, oscillator circuit OSC1 functions in free oscillation mode only during the emission of a burst of magnetic field.

In one embodiment, the masking signal has the masking value during the emission of a burst of magnetic field FLD2, and is maintained at this value during a supplementary lapse of time following the emission of the burst in order to give antenna signal AS time to stabilize. FIGS. 2A to 2D show this embodiment. FIG. 2A shows signal CKs, FIG. 2B shows signal MS(DTx), FIG. 2C shows signal MSK, and FIG. 2D shows signal Slm, composed of bursts of signal CKs. For reasons of simplicity of the drawings, the frequency of signal CKs is not shown to scale and signal MS(DTx) is shown as composed of peaks of logic value 1 of constant duration Tp, separated by a constant time interval Tp'. In practice, signal MS(DTx) may have any other form as a function of data to transmit DTx, of the coding applied to data DTx, and the manner in which it is generated (in particular with or without a sub-carrier).

FIG. 2D shows that the bursts of signal CKs, of a duration Tp, are applied to the antenna circuit when modulation signal MS(DTx) equals 1 (an inverse convention could be provided). FIG. 2C shows that signal MSK is set at 0 when signal MS(DTx) is equal to 1, and is maintained at 0 during a time Tm greater than Tp but less than Tp+Tp'. The duration of the resynchronization period, during which the oscillator circuit is in the synchronous oscillation mode (designated Tsyn in FIG. 2C), is therefore equal to Tp+Tp'−Tm.

Figure 3B:
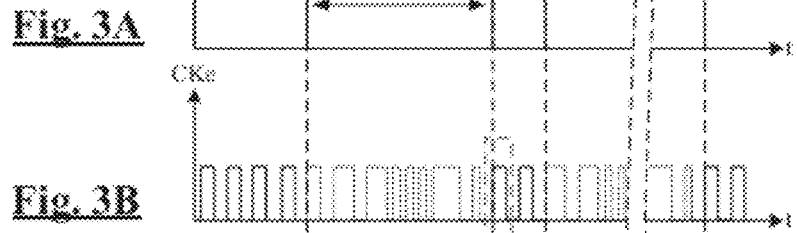
Figure 3C:
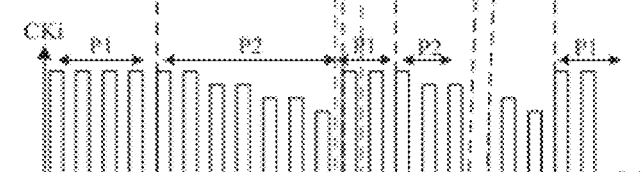
Figure 3D:
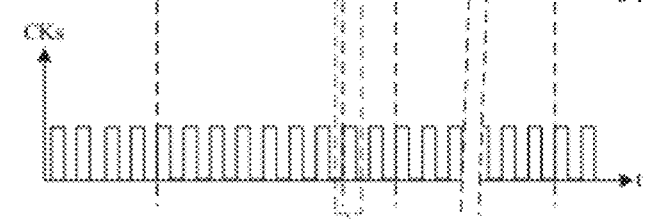

FIGS. 3A to 3D show more precisely the resynchronization mechanism of signal CKs relative to signal CKe, between the emissions of two bursts of magnetic field FLD2. FIG. 3A shows signal MSK and is identical to FIG. 2C. FIG. 3B shows signal Cke, FIG. 3C shows an internal oscillation signal CKi of oscillator circuit OSC1, and FIG. 3D shows signal CKs. Signals Cki and CKs are identical in frequency and only differ in their amplitudes, that of signal CKs being brought to the logic level 1 or 0.

FIG. 3B shows that external clock signal CKe has a phase that may fluctuate during free oscillation periods. Indeed, during these periods, internal clock signal CKs is injected in the antenna circuit and is superimposed on the signal induced by external magnetic field FLD1. Even though signal CKs is synchronized with a good enough precision to external clock signal CKe, the phase difference between the induced signal and the injected signal may be sufficient to cause a phase fluctuation rendering the antenna signal unable to supply a reliable external clock signal CKe. FIGS. 3C and 3D show however that the phase of internal clock signal CKs remains essentially stable during the free oscillation periods (designated by reference P2) thanks to frequent resynchronization periods (designated by reference P1) of duration Tsyn.

Figure 4:
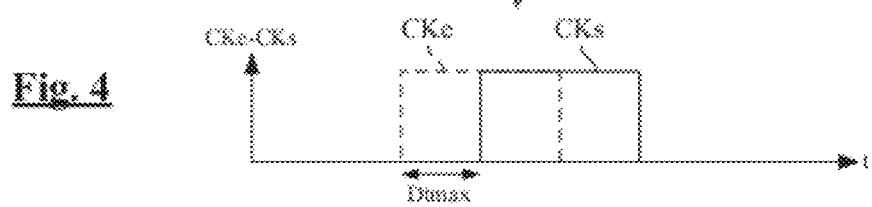
FIG. 4 shows a phase error between a first periodic signal and a second periodic signal used by the device of FIG. 1.

FIG. 4 shows maximum de-phasing Dtmax (expressed as temporal shift) between signal CKs and signal CKe, at the moment where signal CKs will be resynchronized on signal CKe, because signal MSK will again become equal to 1. The value of Dtmax depends on the precision of oscillator circuit OSC1, chosen as a function of the intended application. A maximum phase difference of ¼th of the period of signal CKe may for example be envisaged.

Thanks to the resynchronizations intervening before each emission of a burst of magnetic field FLD2, it is not necessary that oscillator circuit OSC1 have an extreme precision guaranteeing a maximum de-phasing of ¼th of the period over the entire duration of a data frame DTx. The necessary precision is brought to the scale of a bit of data DTx, and more precisely to the scale of the duration of a burst of magnetic field, which may only represent a fraction of bit DTx depending on the coding used (a binary data may be coded as several bursts of magnetic field).

Figure 5:
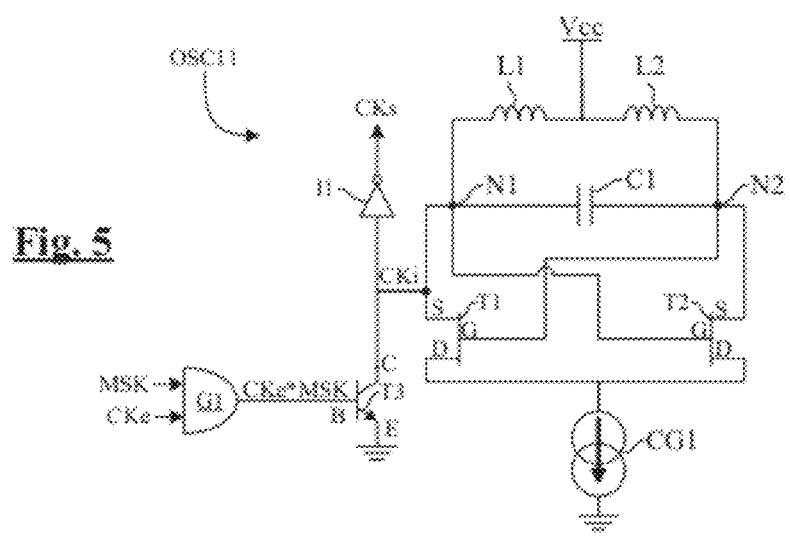
FIG. 5 shows a first embodiment example of a synchronous oscillator.

Various types of oscillator circuits may be provided to make synchronous oscillator OS. As an example, FIG. 5 shows an oscillator circuit OSC11 including an oscillator core of the astable multivibrator type (also known as an astable oscillator). This oscillator core includes two self-inductors L1, L2, a capacitor C1, two transistors T1, T2 of MOS type, and a current source CG1. Inductor L1 is connected between a supply node receiving a voltage Vcc and a node N1. Inductor L2 is connected between voltage Vcc supply node and a node N2. Capacitor C1 is connected between nodes N1, N2. Transistor T1 has its source S connected to node N1, its drain D linked to ground by the intermediary of current source CG1, and its gate G connected to node N2. Transistor T2 has its source S connected to node N2, its drain D linked to ground by the intermediary of current source CG1, and its gate G connected to node N1.

Moreover, the synchronization input of oscillator circuit OSC11 is formed by base B of a bipolar transistor T3 of which emitter E is linked to ground and of which collector C is linked to node N1. The output of the oscillator circuit is formed by an inverter gate I1 supplying signal CKs, the input of which is linked to node N1, on which internal oscillation signal CKi is present.

When signal CKe is applied to base B of transistor T3 (MSK=1), the phase of signal CKi on node N1 is imposed by signal CKe. The core of the oscillator circuit no longer functions as an astable oscillator but as a monostable oscillator.

When signal MSK is equal to 0, transistor T3 is no longer conducting and the core of the oscillator circuit functions in astable oscillator mode and oscillates freely at an auto-oscillation frequency. This frequency is set as close as possible to the frequency of signal CKe (13.56 MHz in the framework of the previously cited standards) by an appropriate choice of inductors L1, L2 and of capacitor C1.

In one embodiment variation, oscillator circuit OSC1 may be of the digital type and configured to, in the synchronous oscillation mode, analyze and store the frequency of signal CKe received on the synchronization input, and re-copy signal CKe on its output. When it switches into the free oscillation mode, the oscillator circuit reconstructs signal CKs from this stored value.

As another realization example, FIG. 6 shows an oscillator circuit OSC12 including a phase locked loop. Circuit OSC12 includes a gate G10 of the exclusive OR (XOR) type, and active low-pass filter FT1, a voltage-controlled oscillator VCO, a follower circuit SCT, and a gate G11 of the AND type. The VCO supplies internal oscillation signal CKi. This is applied to circuit SCT, of which the output supplies internal clock signal CKs. Internal oscillation signal CKi is also sent back to an input of gate G10 by the intermediary of gate G11, which receives on another input signal MSK. Another input of gate G10 forms the synchronization input of circuit OSC12 and is linked to the output of gate G1, which supplies external clock signal CKe when signal MSK is equal to 1. Gate G10 forms a phase comparer and its output is sent to a control input of the VCO by intermediary of active low-pass filter FT1.

When signal MSK is equal to 1, gate G11 is conducting, gate G10 receives both signal CKi and signal CKe and supplies a phase-difference signal. This differential signal forms, after low-pass filtering, a threshold voltage of the VCO. signal Cki is thus enslaved in phase with signal CKe. When signal MSK goes to 0, the outputs of gates G1 and G11 go to 0. The output of gate G10 is forced to 0. A mechanism is preferred to allow the VCO to maintain, on its input, the threshold voltage that it received before signal MSK went to zero. The mechanism may be, for example, a voltage source arranged in active low-pass filter FT1, such as a charge pump. Thus, the VCO continues to supply signal CKi and maintains the phase of signal CKi close to that of signal CKe.

FIGS. 7A to 7E show schematically a data reception DTr sequence (left part of the figures) as well as a data emission DTx sequence (right part of the figures). 100721 FIG. 7A shows the form of antenna signal AS. FIG. 7B shows modulation signal MS(DTr) extracted from antenna signal AS by circuit DMCT. FIG. 7C shows active load modulation signal Slm including bursts of signal CKs. FIG. 7D shows modulation signal MS(DTx), and FIG. 7E shows signal CKs. signal AS is here a full-wave rectified alternating signal that is the image of magnetic field FLD1 in reception mode. Embodiments of antenna circuit ACT may however include a rectifier diode of the antenna signal. In this case, it is a semi-alternating signal.

During the reception of data DTr, external device EDV (see e.g., FIG. 1) modulates the amplitude of magnetic field FLD1 with a modulation depth that depends on the chosen communication protocol, and antenna signal AS has a similar amplitude modulation. Periods of non-modulation NM where the amplitude of the antenna signal is maximum and modulation periods AM where the amplitude of the antenna signal is minimum, may be distinguished. The voltage maxima and minima of signal AS depend in practice on the distance between external device EDV and device ND1.

During the emission of data DTx, antenna signal AS also has non-modulation periods NM where its amplitude is identical to that observed during the non-modulation periods during the data reception. The amplitude of the antenna signal only depends on magnetic field FLD1 emitted by external device EDV and on the distance between the two devices. Signal AS also has over-voltage periods ALM during the sending of bursts of magnetic field FLD2. Indeed, signal CKs is injected in the antenna circuit and is superimposed on the signal induced by external magnetic field FLD1. The antenna signal thus includes an induced component and an injected component.

It will clearly appear to the skilled person that data emission/reception device ND1 according to embodiments of the invention is susceptible of various embodiments. In particular, modulation circuit MCT may include, in addition to the active load modulation means that have been described, conventional passive load modulation means, such as a load modulation interrupter connected to antenna circuit ACT.

In an embodiment variation, signal MSK is applied to gain control circuit AGC, which is configured to force to 0 the output of amplifier A2. In this case, it may be unnecessary to prevent the application of signal CKe to the synchronization input of oscillator circuit OSC1, this latter automatically switching into the free oscillation mode when signal CKe goes to 0.

Device ND1 may also include a mechanism for extracting a supply voltage Vcc from the antenna signal, such as a rectifier circuit followed by a smoothing capacitor, to allow device ND1 to function in a purely passive mode in the absence of a local supply source.

In an embodiment shown in FIG. 8, device ND1 also includes an oscillator OSC2 that is not synchronized to external clock signal CKe, for example a quartz oscillator. Oscillator OSC2 supplies a clock signal CK2 allowing device DV1 to function in NFC reader mode to dialogue with a passive contactless integrated circuit or with a similar device configured in passive mode. In this case, synchronous oscillator circuit OSC1 may continue to be used to supply internal clock signal CKs. The selection of clock signal CKe or CK2 applied to the synchronization input of circuit OSC1 may be made using signal DET described above, by giving the priority to the passive mode.

Still in reference to FIG. 8, two gates G3 and G4 are added and gate G1 is modified to have three inputs. Gate G3 is an AND gate having three inputs of which one is an inverter. Gate G4 is a two-input OR gate. Gate G3 receives signal CK2 and signal MSK on its two non-inverting inputs, and receives signal DET on its inverting input. Gate G1 receives signals CK2, DET, and CKe on its inputs. The outputs of gates G1 and G3 are applied to gate G4, the output of which is linked to the synchronization input of oscillator circuit OSC1. When signal DET is equal to 1 (presence of an external magnetic field FLD1), the output of gate G3 is forced to 0 and the device functions in passive mode in the manner described above. When signal DET is equal to 0, the output of gate G1 is forced to 0 and signal MSK is forced to 1 by circuit MG. clock signal CK2 is applied to the input of oscillator circuit OSC1, for the permanent emission of magnetic field FLD1. The structure of gate G2, receiving signals CKs and MS(DTx) and supplying signal Slm, may be modified so that it ensures a modulation of signal CKs with an adjustable modulation depth less than 100%, in particular if the device must be in conformance with the standards ISO 14443A and 1443B.

Figure 9:
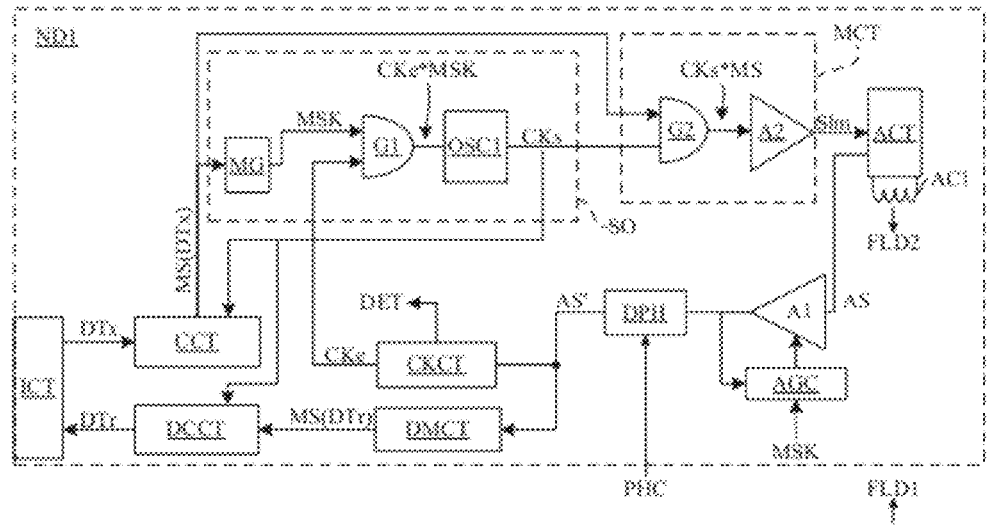
FIG. 9 shows another implementation variation of the device of FIG. 1.

In the embodiment example shown in FIG. 9, device ND1 includes a phase shifter DPH. This phase shifter is, for example, arranged at the output of amplifier A1. Phase shifter DPH applies a phase difference Dp to antenna signal AS and supplies a phase shifted antenna signal AS to clock circuit CKCT and to demodulation circuit DMCT. The phase difference Dp may be determined and set during the conception of phase shifter DPH. Alternatively, the phase difference Dp may be determined dynamically by a command PHC applied to the phase shifter, which specifies the value of the phase difference Dp, for example between 0 and 360°.

Phase shifter DPH allows device ND1 to emit bursts of magnetic field FLD2 that have the phase difference Dp relative to external magnetic field FLD1. This allows for example, in certain applications where the communication distance should not go beyond a certain limit (for example, for security reasons), to reduce the communication distance to beneath this limit.

This embodiment shows that the control of the phase of signal CKs using the synchronous oscillator SO allows more than just a zero phase difference between magnetic field FLD2 and magnetic field FLD1. The control of the phase of signal CKs using the synchronous oscillator SO may also allow to control a voluntary desynchronization of magnetic field FLD2 relative to magnetic field FLD1, all while maintaining the phase difference Dp between the two magnetic fields at a value as constant as possible.

Figure 10:
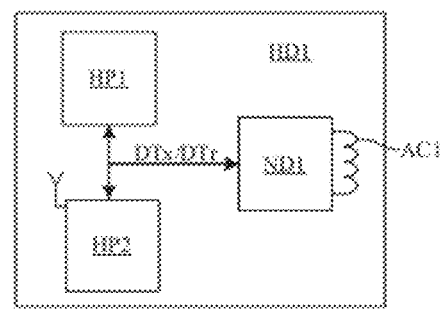
FIG. 10 shows an example of a portable device including a data emission/reception device according to an embodiment of the invention.

Data emission/reception device ND1 according to embodiments of the invention is also susceptible of various applications. In an application example shown in FIG. 10, device ND1 is integrated in a portable device HD1 and is linked to one or more host processors, here two host processors HP1, HP2 that use device ND1 as a contactless communication interface (NFC interface). Portable device HD1 is, for example, a mobile telephone, a digital music player, or a personal digital assistant (PDA). Processor HP1 may be the principal processor of the device, or a secure processor such as a SIM card processor. Processor HP2 may for example be the baseband processor of a mobile telephone, also performing GSM channel communications.

Figure 11A:
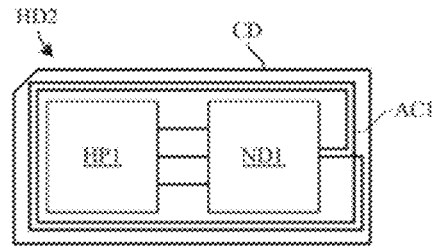
FIGS. 11A, 11B are top and bottom views of another example of a portable device including a data emission/reception device according to the invention.
Figure 11B:
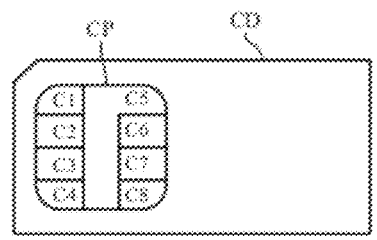

In another application example shown in FIGS. 11A, 11B, device ND1 is linked to a host processor HP1 and the ensemble is integrated in a plastic support CD to form a chip card HD2. Antenna coil AC1 is for example a coplanar antenna coil having one or more windings. On its back face (FIG. 11B), card HD2 is equipped with a group CP of contacts. Card HD2 may for example form a SIM-NFC card. The group of contacts may include in this case contacts C1 to C8 according to the standard ISO 7816. Card HD2 may also form a card of the SD type, intended to be inserted in any type of device (mobile telephone, personal computer, or the like) as an NFC communication interface.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of transmitting data by inductive coupling and active load modulation, the method comprising:
   receiving an antenna signal using an inductive antenna circuit in the presence of an alternating external magnetic field;

extracting from the antenna signal a first periodic signal;
producing a second periodic signal using a synchronous oscillator having a synchronization input receiving the first periodic signal, the synchronous oscillator having a synchronous oscillation mode set in phase with the first periodic signal and a free oscillation mode;
applying to the antenna circuit bursts of the second periodic signal of a duration less than that of one bit of the transmitted data to generate an active load modulation magnetic field;
placing the synchronous oscillator in the synchronous oscillation mode before each application of a burst of the second periodic signal to the antenna circuit; and
placing the synchronous oscillator in the free oscillation mode during the application of a burst of the second periodic signal to the antenna circuit, such that the synchronous oscillator is resynchronized to the first periodic signal at least once at each transmission of a data bit.

2. The method according to claim 1, further comprising, after the application of a burst of the second periodic signal to the antenna circuit, maintaining the synchronous oscillator in the free oscillation mode during a stabilization time of the antenna signal, before placing the synchronous oscillator back in the synchronous oscillation mode.

3. The method according to claim 2, further comprising:
supplying a data carrying modulation signal;
applying the second periodic signal to the antenna circuit when the data carrying modulation signal has a first logic value;
generating a masking signal having a masking value at least when the data carrying modulation signal has the first logic value; and
blocking the application of the first periodic signal to the synchronization input of the synchronous oscillator when the masking signal has the masking value.

4. The method according to claim 3, further comprising conferring to the masking value of the masking signal a duration greater than that of the first logic value of the data carrying modulation signal, in order to maintain the synchronous oscillator in the free oscillation mode during the stabilization time of the antenna signal.

5. The method according to claim 1, further comprising a step of phase shifting the second periodic signal relative to the antenna signal.

6. A data transmission/reception device by inductive coupling comprising:
an inductive antenna circuit in which an antenna signal appears in the presence of an alternating external magnetic field;
a clock circuit configured to extract a first periodic signal from the antenna signal;
a synchronous oscillator having a synchronization input receiving the first periodic signal, supplying a second periodic signal, the synchronous oscillator having a synchronous oscillation mode set in phase with the first periodic signal and a free oscillation mode; and
an active load modulation circuit configured to apply bursts of the second periodic signal of a duration of less than that of one bit of the transmitted data to the antenna circuit and to generate an active load modulation magnetic field, wherein the device is configured to:
place the synchronous oscillator in the synchronous oscillation mode before each application of a burst of the second periodic signal to the antenna circuit, and
place the synchronous oscillator in the free oscillation mode during the application of a burst of the second periodic signal to the antenna circuit, such that the synchronous oscillator is resynchronized to the first periodic signal at least once at each transmission of a data bit.

7. The device according to claim 6, further configured to, after the application of a burst of the second periodic signal to the antenna circuit, maintain the synchronous oscillator in the free oscillation mode during a stabilization time of the antenna signal, before again placing the synchronous oscillator in the synchronous oscillation mode.

8. The device according to claim 7, further configured to:
generate or receive a data carrying load modulation signal,
apply the second periodic signal to the antenna circuit when the data carrying modulation signal has a first logic value;
generate a masking signal having a masking value at least when the data carrying modulation signal has the first logic value; and
block the application of the first periodic signal to the synchronization input of the synchronous oscillator when the masking signal has the masking value.

9. The device according to claim 8, further configured to confer, to the masking value of the masking signal, a duration greater than that of the first logic value of the data carrying modulation signal, in order to maintain the synchronous oscillator in the free oscillation mode during the stabilization time of the antenna signal.

10. The device according to claim 6, wherein the synchronous oscillator is an astable oscillator having an auto-oscillation frequency determined by components of the synchronous oscillator.

11. The device according to claim 6, wherein the synchronous oscillator is a digital oscillator and is configured to, in the synchronous oscillation mode, recopy the period of the periodic signal applied on the synchronization input, and, in the free oscillation mode, reconstruct the frequency received on the synchronization input during the synchronous oscillation mode.

12. The device according to claim 6, wherein the synchronous oscillator comprises a phase locking loop comprising:
a phase comparator supplying a phase signal,
an active low-pass filter receiving the phase signal and supplying a control voltage,
a voltage controlled oscillator receiving the control voltage and supplying the second periodic signal, and
a circuit configured to block the phase comparator when switching into the free oscillation mode and to maintain the value of the control voltage at the input of the voltage controlled oscillator.

13. The device according to claim 6, further comprising a phase shifter configured to phase shift the second periodic signal relative to the antenna signal.

14. A device comprising:
a data emission transmission/reception device according to claim 6, and
at least one host processor supplying the data to transmit to the device.

15. The device according to claim 14, mounted in or on a portable support.

16. A chip card comprising at least one processor and a data transmission/reception device according to claim 6.

* * * * *